Figure 4:
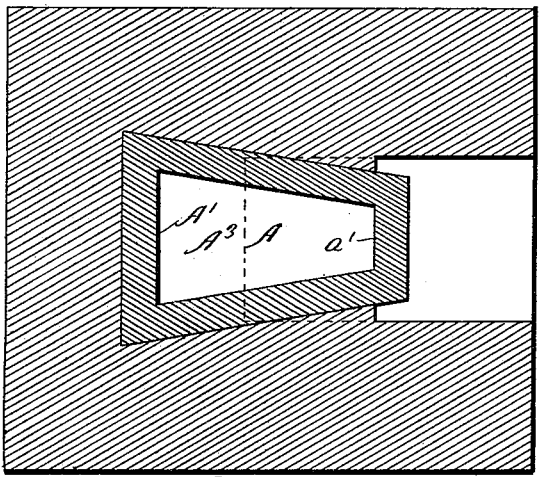

(No Model.) 3 Sheets—Sheet 1.

JOSEPH DRUECKER & JOHN DRUECKER.
LIMEKILN.

No. 406,434. Patented July 9, 1889.

Witnesses:

Inventors:
Joseph Druecker
John Druecker
By Munday Evarts & Adcock
their Attorneys

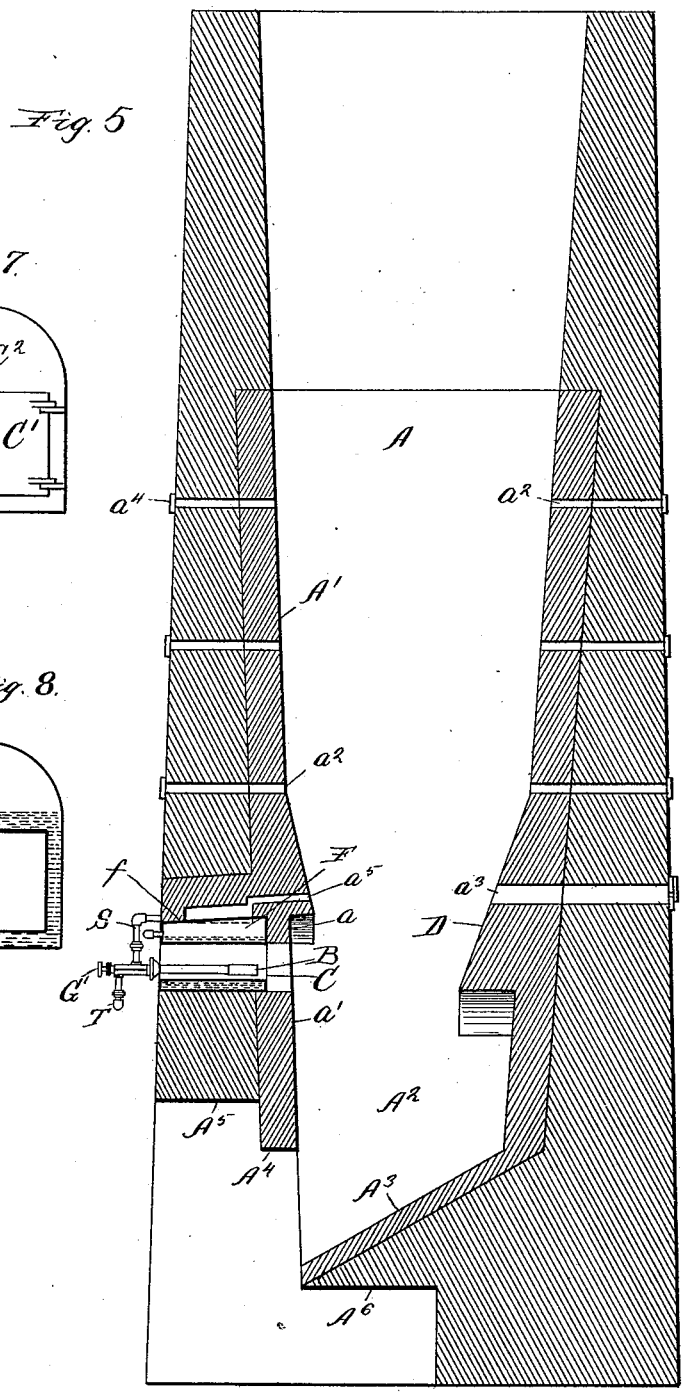

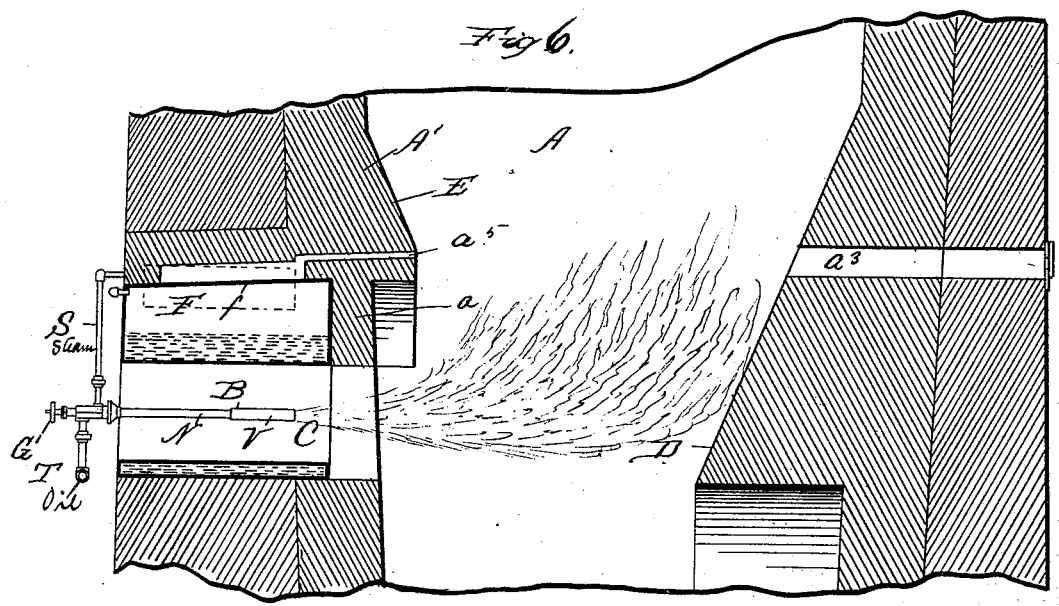

UNITED STATES PATENT OFFICE.

JOSEPH DRUECKER, OF DRUECKER, WISCONSIN, AND JOHN DRUECKER, OF CHICAGO, ILLINOIS.

LIMEKILN.

SPECIFICATION forming part of Letters Patent No. 406,434, dated July 9, 1889.

Application filed December 10, 1888. Serial No. 293,141. (No model.)

*To all whom it may concern:*

Be it known that we, JOSEPH DRUECKER, a citizen of the United States, residing at Druecker, in the county of Ozaukee, in the State of Wisconsin, and JOHN DRUECKER, also a citizen of the United States, residing in Chicago, in the county of Cook and State of Illinois, have invented a new and useful Improvement in Apparatus for Burning Lime, &c., of which the following is a specification.

Our invention relates to the manufacture of lime, and more particularly to the manufacture of lime by petroleum or other liquid hydrocarbon fuel.

In the practical manufacture of lime it is found necessary to supply a certain quantity of moisture or water in some form to the burning lime or stone, as the presence of the vapor of water promotes the escape of the carbonic-acid gas and the conversion of the limestone into lime. The vapor of water also has during the burning operation a beneficial effect upon the quality of the lime produced and tends to free it from impurities. Where the burning is done with wood fuel the wood itself usually contains a sufficient supply of water to mix with the products of combustion, though on this account it is found that the best lime is generally always produced by the softer woods than by dry hard woods—such as maple, for example. Where coal is used for burning lime it is customary to set pans of water in the ash-pit to supply the necessary moisture or vapor to the kiln. The moisture which may be in the fresh-quarried limestone when it is put in at the top of the cupola is to a very large extent, if not completely, evaporated before the stone feeds down into proximity to the fire or intense heat where the lime-producing process or conversion takes place, so that moisture from other sources must be supplied.

While lime heretofore has usually been burned with coal or wood fuel or a combination of the two, the manufacture has been attended with many serious objections, such as the mixture of ashes or other foreign substances with the lime, the impregnation of the lime with sulphur or other deleterious substances to a greater or less extent, and the unequal burning of different portions of the rock, and the labor and expense incident to handling the fuel and firing the kiln.

Attempts have heretofore been made to burn lime with a liquid hydrocarbon—such as petroleum, for example. One method, which is shown and described in the patent to Smith, No. 174,387, consisted in projecting the liquid fuel associated with steam into combustion-chambers arranged diametrically opposite each other in the wall of the kiln, where the same was intermingled with air and ignited, so that the combustion of the fuel took place in these combustion-chambers outside of the cupola in the walls of the kiln. This process is objectionable, because a large percentage of the heat arising from the combustion of the fuel is necessarily expended upon the walls of the combustion-chambers instead of being expended upon the limestone in the cupola, and because the excessive heat due to the burning of the hydrocarbon fuel in these combustion-chambers must necessarily tend to very rapidly burn out or melt down the fire-brick and destroy the kiln. Indeed, we have been informed that this method was tried by Uriah Cummings, Lewis J. Bennett, and William W. Pierce, of Buffalo. Said Uriah Cummings, in his patent, No. 182,419, states in relation to this Smith process that "with steam, however, under perfect combustion I find that the heat is too intense and exercises a deleterious influence upon cement and lime, as well as destroys rapidly the furnace-brick."

Another method by which it has or may have heretofore been attempted to manufacture lime with hydrocarbon fuel consisted in injecting a carbonized air spray consisting of liquid hydrocarbons—such as petroleum mingled with a jet of air—directly upon the stone at a red heat from jet nozzles or pipes placed diametrically opposite each other in openings on opposite sides of the cupola, as fully shown and described in the patent to said Uriah Cummings, No. 182,419, of September 19, 1876; but by this method no moisture or vapor of water of any form is supplied to the kiln or limestone during the burning operation; and, secondly, the injection of the carbonized air spray directly upon the hot stone will necessarily tend to blacken and injure the lime with which such spray comes in contact, as well as tend to cause the same to fuse or melt under the action of the heat. We have learned from our experiments, which have been continued through several years last past, and which have been conducted at great expense, that it is absolutely essential to the production of good lime and to the success of any process of burning lime with liquid-hydrocarbon fuel that no part of the liquid-hydrocarbon fuel, however finely it may be atomized or sprayed, must be allowed to strike against the limestone. As is well known to those skilled in the art, carbon or hydrocarbon operates as a flux upon the limestone and causes it readily to fuse and disintegrate, one well-known method of fusing limestone being to saturate it with carbon or hydrocarbon while it is being subjected to great heat, as is shown and described, for example, in patent to Reese, No. 249,548, November 15, 1881.

Heretofore, also, attempts have been made to so construct the kiln by lining the combustion-chamber or recess surrounding the burner with water-backs as that the process of the Smith patent before referred to may be used without melting down the fire-brick walls of its combustion-chamber, as shown and described in the patent to Hunt, No. 330,121, of November 10, 1885; but this provision of a water-back does not remove the more serious objections to the practical use of the Smith process—to wit, the great loss of heat which is expended upon the walls of the combustion-chamber or burner-recess and the deleterious influence upon the lime incident to the intense heat to which portions of the lime must necessarily be subjected in such process.

To prevent the loss of fuel and the deterioration of fire-brick incident to the combustion of the liquid hydrocarbon in a combustion-chamber or burner-recess at the side of the cupola, we endeavored in our experiments to project the mouth or nozzle of the burner in about flush with the interior wall of the cupola. By so doing we overcame the difficulties above mentioned; but we found this method objectionable, owing to the difficulty in preventing particles of the liquid fuel unignited being projected against the heated stone or lime in the cupola, and thus injuring the quality of the lime as well as wasting the fuel. Another objection which we found by experiment to exist with this method was the difficulty in keeping an open space or cavity in the mass of stone or lime in the cupola immediately in front of the burner nozzle or mouth, the tendency of the lime or stone in the cupola being to fall down from time to time during the burning operation and fill up the cavity or open space in front of the burner, so that the flame or blast impinging against the stone or lime immediately in front of the burner will be reflected or driven back into the burner-recess, and thus frequently occasion the very difficulty designed to be remedied by such location of the burner near the inner edge of the cupola-wall. We found also by our experiments that where, as in the methods heretofore in use, the liquid-hydrocarbon burners are arranged diametrically opposed to each other on opposite sides of the cupola, the tendency of the opposing blasts blown into the cupola from the opposite burners is, in a measure, to neutralize each other, and also to produce an intensity of heat at the point where they meet, at the expense of the proper diffusion of the heat throughout the mass of stone in the cupola, thus resulting in defective work and in an uneconomical use of the fuel. Heretofore, however, it has always been considered necessary in burning lime with liquid hydrocarbons, at least so far as we know, to employ burners on different sides of the kiln, in order that the flame or blast may be made to extend entirely throughout the mass of stone in a cupola of the required cross-sectional area for economical use. It perhaps should be here stated that for economical use the longer diameter of the kiln should ordinarily be about seven feet and its shorter diameter about five. These dimensions are not fanciful, but determined by practical experience. If the kiln or cupola is made much smaller than this, the mass of stone operated upon at once or at each successive draw is too small for economical burning. The relative area of expensive fire-brick lining (which on an average requires to be renewed about every six or twelve months) in the kiln for a given amount of lime produced is largely increased, as well as the loss of heat throughout the surrounding walls. On the other hand, if the diameter of the kiln is materially increased above these dimensions, it is found that the pressure of the superincumbent mass of stone in the cupola (which is ordinarily about forty feet high) is too great upon the arched and heated stone and lime in the lower portions of the kiln, thereby causing the heated stone or lime of the arch to crumble under the pressure and choke up the air passages or crevices between the individual stones, so as to interfere with the burning and also injure the quality of the lime.

It is the object of our invention to overcome the various difficulties and objections heretofore incident to the burning of lime with petroleum, and to provide a simple and efficient process and means for burning lime with petroleum or other like liquid-hydrocarbon fuels, which will operate to produce economically, without loss of heat or fuel, lime of a uniform and good quality and free from impurities, and which may be practiced continuously without melting or injuring the fire-brick or any portion of the kiln.

To this end our invention consists in the means we employ to accomplish such result—that is to say, it consists, first, in a kiln having a single burner-recess in the walls thereof at one side of the cupola, in combination with a hydrocarbon-burner mounted in said recess, whereby the flame or ignited fuel is projected in a blast wholly from one side of the kiln, so that there shall not be two opposing blasts to neutralize each other.

Our invention also consists, in connection with a kiln having a single burner-recess, of a liquid-hydrocarbon burner mounted therein with its mouth or nozzle about eighteen inches from the interior wall of the cupola, and provided with means for producing a strong blast of air and steam, so that the liquid fuel will be completely vaporized and ignited and mixed with the blast of air and steam, and the flame blown forcibly out of the burner-recess into the cupola and through the mass of stone therein, so that the combustion may take place in the cupola, and at the same time no particles of oil will be projected upon the stone or lime.

It further consists, in connection with the kiln, its single burner-recess, and the burner so mounted, in providing the rear wall of the kiln with an inclined arched wall for the purpose of deflecting the blast of flame from the burner upward, and at the same time slightly diminishing the distance across the cupola directly in front of the burner. This inclined arch, it will be observed, does not in any way diminish the capacity of the hopper below the same, and which measures the batch or draw of lime which is burned at once, so that the actual capacity of the kiln is in fact not diminished. This inclined deflecting fire-brick wall also tends to make the blast of flame and intense heat extend somewhat higher in the cupola.

The invention further consists, in connection with the above, in providing the kiln with a slightly-projecting inclined arch directly above the burner-recess, which tends to prevent the lime or stone in the cupola from accumulating in front of the burner-recess and too close to the mouth of the burner.

The invention further consists in the novel devices and novel combinations of parts and devices herein shown and described, and more particularly pointed out in the claims.

In the accompanying drawings, which form a part of this specification, we have shown an apparatus or kiln suitable for practicing our invention and that which we deem to be the best form now known to us for putting our invention in practice.

In the drawings similar letters of reference indicate like parts in all the figures.

Figure 3:
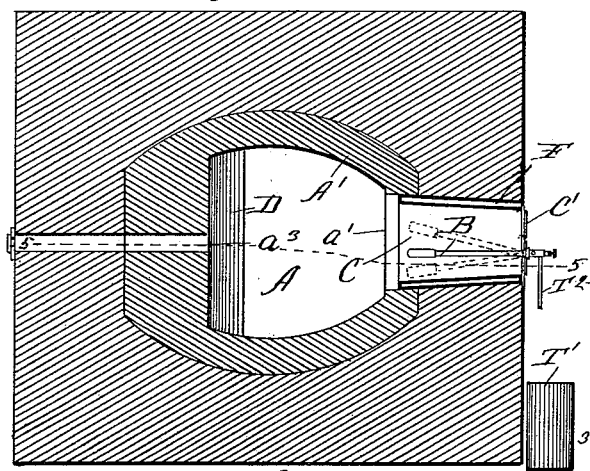
Figure 2:
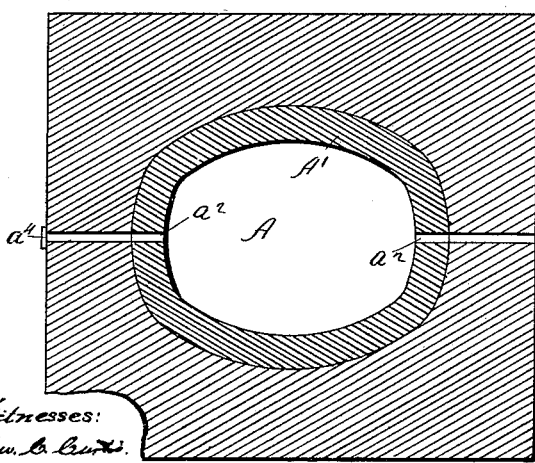
Figure 1:
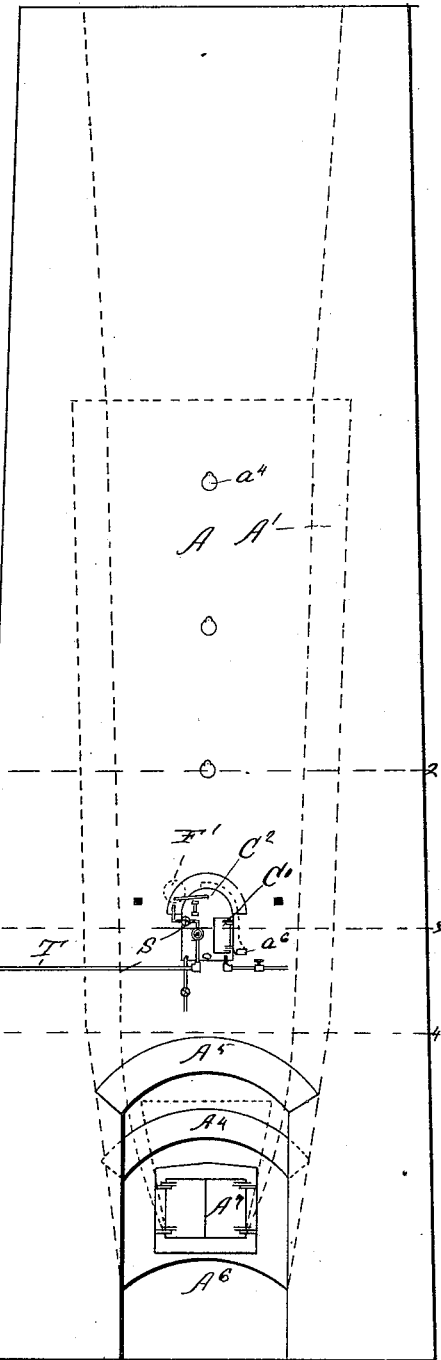

In said drawings, Figure 1 is a front elevation of a kiln embodying our invention. Figs. 2, 3, and 4 are horizontal sections on lines 2 2, 3 3, and 4 4, respectively, of Fig. 1. Fig. 5 is a central vertical section on line 5 5 of Fig. 3. Fig. 6 is an enlarged central vertical section through the burner-recess portion of the kiln. Fig. 7 is a front elevation of the boiler, and Fig. 8 is a cross-section thereof.

In the drawings, A represents the kiln, which is preferably forty or fifty feet high and of an oval shape in cross-section, the longer diameter being about seven feet and the shorter about five feet.

A' represents the fire-brick lining constituting the inner wall of the cupola.

B is the burner and C is the burner-recess in the walls of the kiln at one extremity of the larger diameter. Directly opposite the burner-recess the rear wall of the kiln is furnished with an inclined arched wall D, for the purpose of deflecting the blast of flame issuing from the burner and burner-recess upward. This arch should preferably extend out into the cupola at its base about twenty-seven inches, and its inclined face should preferably be about ten feet in height, though these dimensions or proportions may be varied.

The front fire-brick wall A' of the cupola is provided directly over the burner-recess with an inclined arched projection E, which extends out into the cupola at its base preferably about nine inches, the inner face of this arched projection being inclined upward preferably three or four feet, where it unites with the vertical wall of the cupola. This inclined arch projection E serves to prevent the stone or lime from tumbling down in front of the burner-recess and to keep an open space or cavity at the mouth of the burner-recess for the better issuance of the flame and blast into the cupola and through the stone and lime therein. The central portion of this arch E, as will be seen at Fig. 5, is somewhat above the top wall or edge of the burner-recess C, thus in effect giving the burner-recess an enlarged mouth or opening into the cupola.

The walls of the burner-recess C, excepting, preferably, about the inner nine inches thereof, are formed or are preferably formed by the hollow or shell-shaped boiler F. This boiler F does not extend entirely through to the inner edge of the wall of the cupola, the wall of the burner-recess at the mouth thereof being of fire-brick for about nine inches back from the inner face of the cupola, as indicated at $a$. The upper portion $f$ of the boiler is semi-cylindrical, and the inner course of fire-brick $a$ abuts directly against the semicircular end of the upper portion of the boiler. The burner-recess C is preferably rectangular in cross-section, and it should be about two feet in height by about two feet and a half in width. With a burner-recess of this size, and with the mouth or nozzle of the burner at a distance of about eighteen inches from the inner line or edge $a'$ of the cupola, we find by experiment that the liquid-hydrocarbon fuel, when blown from the burner in a blast of air and steam and petroleum, will become fully ignited before striking the stone or lime in the cupola, and that the flame will be carried by the force of the blast through the burner-recess without excessively heating or injuring the walls thereof.

The fire-brick lining $a$ at the inner end of the boiler F serves to protect the end of the boiler from the falling stone, which in falling would tend to crush or injure the same, and also to protect the boiler from the high heat of the cupola. It will be understood that the fire-brick lining of the cupola, especially the lower portion thereof, becomes of a white heat in the practical operation of the kiln.

$A^2$ is the hopper of the kiln, which contains the lime of one draw or batch while the limestone of the next succeeding draw above is being burned or converted into lime. The hopper $A^2$ is of the usual shape and size, and has the customary inclined base $A^3$, arches $A^4$, $A^5$, and $A^6$, and doors $A^7$, through which the lime is withdrawn from the kiln. The kiln is also provided with the usual poke or peek holes $a^2$, and also with a larger poke or peek hole $a^3$, which extends through the inclined-faced arch D at a point somewhat above the burner. These poke or peek holes are all closed by doors or shutters $a^4$. An air-duct $a^5$ also opens into the kiln through the inclined-faced arch E. This air-duct is provided with a damper or valve $a^6$. The function of this air-duct is twofold. One function is at intervals, as may be required, to let additional air into the cupola for the more complete combustion of the fuel. This air-duct extends directly over the boiler F, and another function of the same is to let cold air in over the boiler, and thus cool the same, if at times it should become too hot. The boiler F is provided with a steam-dome F'. This dome is embedded in the masonry above the boiler F.

The burner B is connected by a pipe T with the oil-reservoir T' and by the pipe S with the boiler F or its dome F'. The tank T' should be located, preferably, at a considerable distance from the kiln, and preferably at an elevation of ten or fifteen feet above the burner, so that the hydrostatic pressure of the oil in the tank will aid the pumping action of the steam-blast in feeding the oil to the burner. These pipes S and T are not fixed rigidly in place, but permit of slight lateral vibrations, so that the burner may turn upon the one or the other of them as a pivot. By thus mounting the burner so it may be swung laterally the direction of the flame may be directed or adjusted as required to cause it to properly penetrate and diffuse itself through the mass of stone in the cupola. The burner-recess C is provided with a door C' at its outer end, and with a head or end piece $C^2$, having an oblong slot $c$, in which the burner rests, such slot permitting this swinging movement of the burner. The burner is also provided with air-passages, whereby a proper amount of air is supplied to the flame.

The construction of burner which we prefer to use is fully set forth in our application filed subsequently to this—namely, May 11, 1889, Serial No. 310,372. The presence of a suitable burner is of course essential to the perfect working of the kiln and the avoidance of the evils we have alluded to, and we refer to said application for a description of the best form now known to us. The burner is not more particularly described herein, as the Patent Office has advised us that such description cannot properly be incorporated in this application.

In applying the burner and boiler to kilns it will be observed that all that is necessary is to form a suitable opening or recess in the wall of the kiln to receive the boiler. The boiler itself affords means for supporting the boiler, and also constitutes the greater portion of the walls of the burner-recess. This is a matter of great convenience in the practical application of our system to kilns already erected.

We claim—

1. The combination of a limekiln having a single burner-recess in the walls thereof at one side of the cupola with a hydrocarbon-burner mounted in said recess, substantially as specified.

2. The combination of a limekiln having but one burner-recess in the walls thereof, and provided with an inclined face, arched projection D opposite said burner-recess, and a hydrocarbon-burner mounted in said burner-recess, substantially as specified.

3. The combination of a limekiln having but one burner-recess in the walls thereof, and provided with an inclined-faced projection D opposite said burner-recess and an oppositely inclined-faced projection E above said burner-recess and opposite said projection D, and a hydrocarbon-burner mounted in said burner-recess, substantially as specified.

4. The combination, with a limekiln having a single burner-recess in the walls thereof at the extremity of the longer diameter of the cupola, of a hydrocarbon-burner mounted in said recess with its mouth or nozzle end about eighteen inches from the inner edge of the cupola-wall, substantially as specified.

5. The combination, with a limekiln having a burner-recess in the walls thereof, of a hydrocarbon-burner pivotally mounted to swing laterally in said burner-recess to adjust the direction of the blast, substantially as specified.

6. The combination, with a limekiln having a burner-recess in the walls thereof and a hydrocarbon-burner mounted in said recess, of a steam-boiler located at said recess, and steam-pipe connections directly from said boiler to the steam-pipe of said burner, whereby the burner is supplied with a blast of dry hot steam, substantially as specified.

7. The combination, with a limekiln having a burner-recess in the walls thereof and a hydrocarbon-burner mounted in said recess, of a steam-boiler heated by said burner, and steam-pipe connections directly from said boiler to the steam-pipe of said burner, whereby the burner is supplied with a blast of dry hot steam, said boiler being in the form of a hollow shell surrounding the burner, substantially as specified.

8. The combination, with a limekiln having a burner-recess in the walls thereof and a hydrocarbon-burner mounted in said recess, of a steam-boiler heated by said burner, and steam-pipe connections directly from said boiler to the steam-pipe of said burner, whereby the burner is supplied with a blast of dry hot steam, said boiler extending only partially through the walls of the kiln, and said kiln having a course of fire-brick between the end of the boiler and the cupola or fire-space of the kiln, substantially as specified.

9. The combination, with a limekiln having a burner-recess in the walls thereof and a hydrocarbon-burner mounted in said recess, of a steam-boiler heated by said burner, and steam-pipe connections directly from said boiler to the steam-pipe of said burner, whereby the burner is supplied with a blast of dry hot steam, said boiler being in the form of a rectangular shell and forming a portion of the side, top, and bottom walls of the burner-recess, and extending through the wall of the kiln to within about nine inches of the interior thereof, the inner end of the boiler abutting against the fire-brick lining of the cupola, substantially as specified.

JOSEPH DRUECKER.
JOHN DRUECKER.

Witnesses:
H. M. MUNDAY,
EDW. S. EVARTS.